United States Patent
Bolognia et al.

(10) Patent No.: US 7,032,746 B2
(45) Date of Patent: *Apr. 25, 2006

(54) COMPACT DISK PACKAGE AND METHOD OF ASSEMBLING SAME

(75) Inventors: David L. Bolognia, Lanesboro, MA (US); Larry D. Durham, Mooresville, NC (US); Ken Frietag, Cheshire, MA (US); George F. Rufo, Jr., Dalton, MA (US)

(73) Assignee: MeadWestvaco Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,166

(22) Filed: Mar. 8, 2005

(65) Prior Publication Data

US 2005/0150792 A1    Jul. 14, 2005

Related U.S. Application Data

(63) Continuation of application No. 10/284,413, filed on Oct. 31, 2002, now Pat. No. 6,886,687.

(51) Int. Cl.
*B65D 85/57* (2006.01)
(52) U.S. Cl. .............................. 206/308.1; 206/307.1; 206/232; 206/472
(58) Field of Classification Search ............. 206/308.1, 206/307, 307.1, 309–312, 232, 493, 472, 206/308.3, 387.13
See application file for complete search history.

(56) References Cited

U.S. PATENT DOCUMENTS

| | | | | |
|---|---|---|---|---|
| 3,109,539 A | * | 11/1963 | David | 206/310 |
| 4,535,888 A | | 8/1985 | Nusselder | |
| 4,709,812 A | | 12/1987 | Kosterka | |
| 4,869,364 A | * | 9/1989 | Bray | 206/232 |
| D324,337 S | * | 3/1992 | Brady | D9/425 |
| 5,366,074 A | | 11/1994 | O' Brien et al. | |
| 5,377,825 A | * | 1/1995 | Sykes et al. | 206/232 |
| 5,573,120 A | | 11/1996 | Kaufman et al. | |
| 5,839,575 A | * | 11/1998 | Blanco | 206/232 |
| 5,950,821 A | * | 9/1999 | Moser | 206/308.1 |
| 6,000,543 A | * | 12/1999 | Joyce | 206/387.13 |
| D433,266 S | | 11/2000 | Peterson et al. | |
| D445,626 S | * | 7/2001 | Myszka et al. | D6/629 |
| D455,312 S | * | 4/2002 | Myszka et al. | D6/629 |
| 6,688,463 B1 | | 2/2004 | Peterson et al. | |
| 6,886,687 B1 | * | 5/2005 | Bolongia et al. | 206/308.1 |

OTHER PUBLICATIONS

Prior Art Device marketed in United States prior to Oct. 31, 2001, two (2) photographs, (photographs missing).

* cited by examiner

*Primary Examiner*—Jila M. Mohandesi
(74) *Attorney, Agent, or Firm*—Stuart J. Friedman

(57) ABSTRACT

A storage package for a recording medium configured to resemble a book includes a paper board panel releasably attached to first and second plastic, recording medium-holding components, each including a planar surface having means on one face for holding a recording. Upstanding wall portions on one of the components nest within the corresponding wall portions of the other component when the components are assembled together.

15 Claims, 4 Drawing Sheets

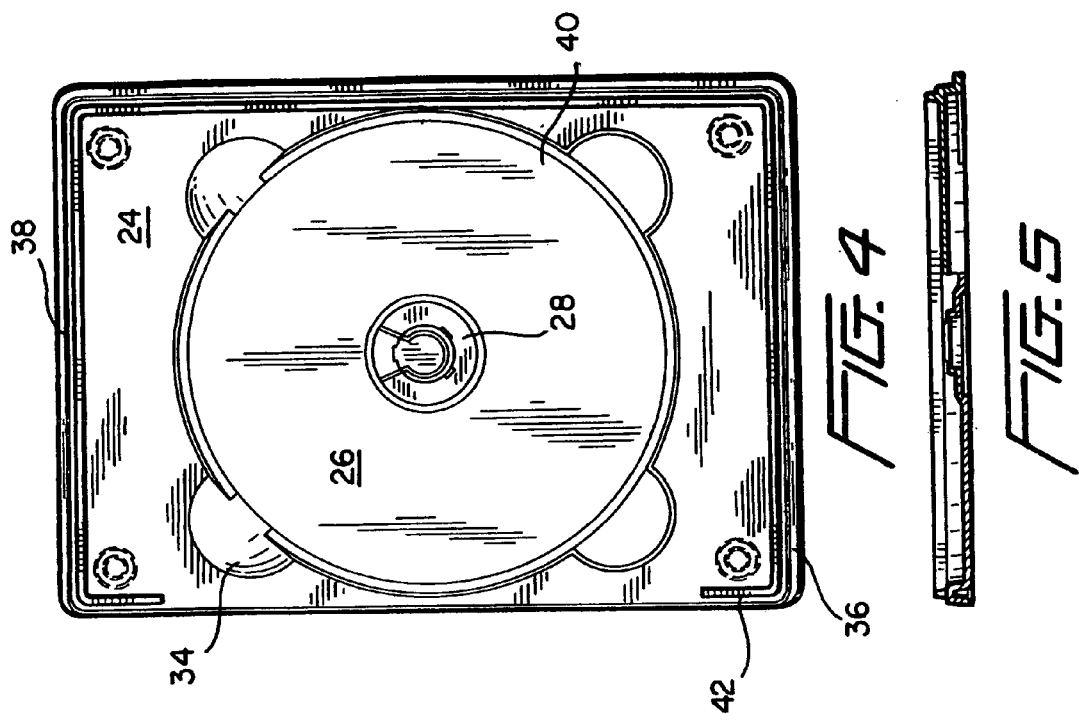
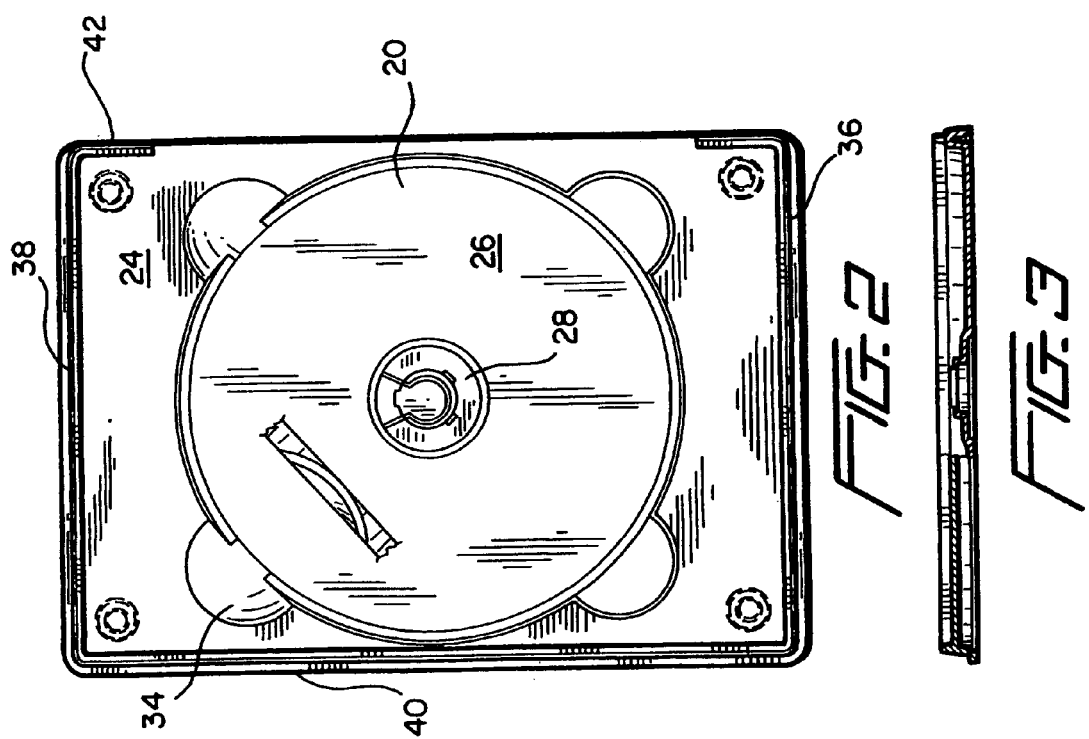

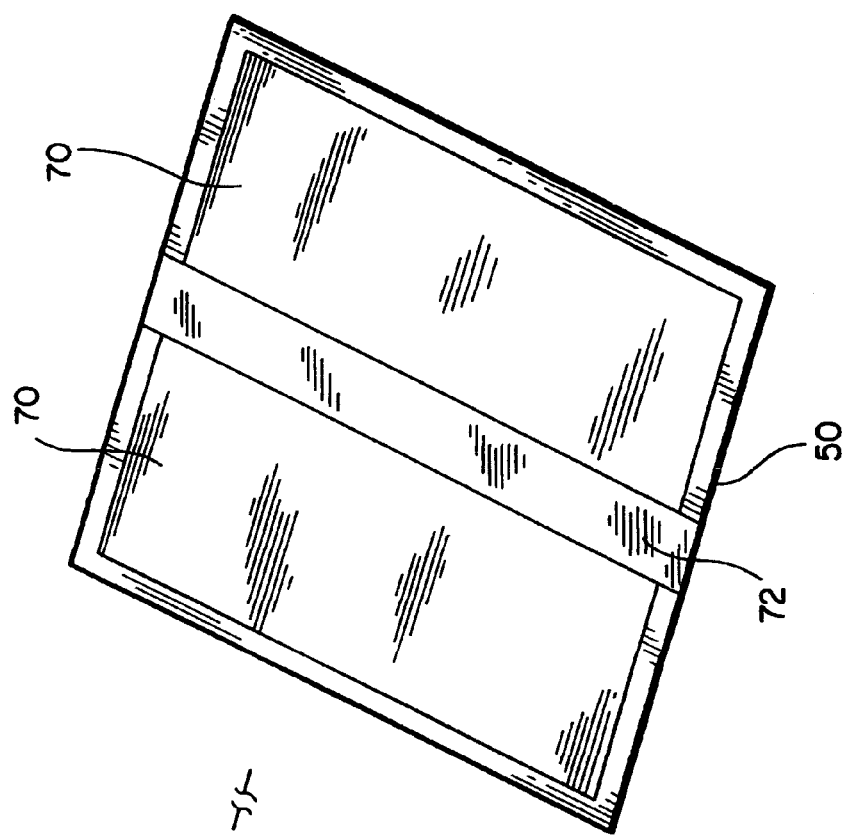
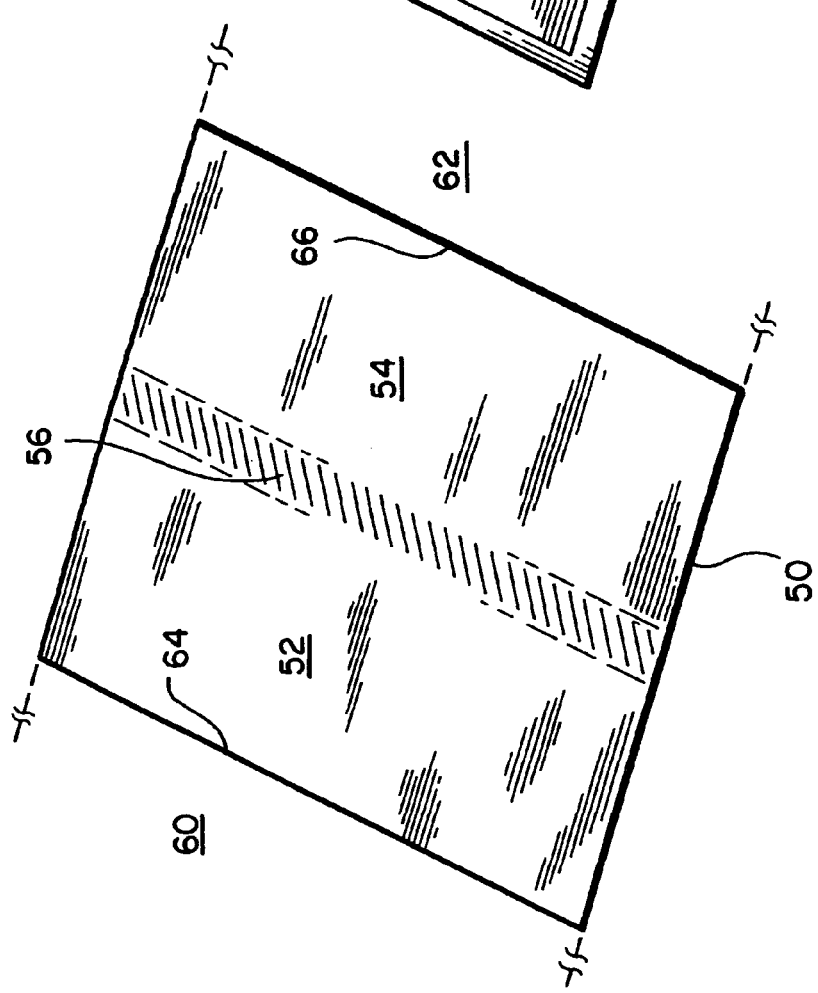

COMPACT DISK PACKAGE AND METHOD OF ASSEMBLING SAME

CROSS-REFERENCE TO RELATED APPLICATIONS

This application is a continuation of U.S. Ser. No. 10/284,413, filed Oct. 31, 2002 now U.S. Pat. Ser. No. 11/075,166.

BACKGROUND OF THE INVENTION

1. Field of the Invention

The present invention relates generally to a closable and latchable storage package for a recording medium and, more particularly, to a package comprising a paperboard cover assembled to multiple plastic disc holders.

2. Description of the Prior Art

Various types of planar discs are in use at the present time to record and store information which is to be retrieved by various means, such as by optical or magnetic means. Typical of such discs are compact discs in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. As used herein, the term compact disc or CD is intended to encompass all such discs, whatever their size, for all known or proposed uses.

Compact discs containing laser recorded information are typically packaged in injection molded plastic enclosures designed to hold one or more CDs for protecting the discs during storage and shipment. Enclosures commonly used at the present time, such as the well known "jewel box," comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the tray, and position and support the disc via the center projection directly on the base/bottom element. The enclosure is, typically, at least partially transparent and graphics relating to the disc and containing trademark and sales promotional information are usually inserted in such a manner as to be visible through the enclosure.

Except for the printed matter inserted therein, the "jewel box" is entirely plastic. For this reason, as well as because the typical jewel box requires three separately injection molded elements which must be manually assembled, the use of this type of enclosure is relatively expensive. Moreover, the use of such an enclosure is believed to be ecologically unacceptable by many because the plastic is non-biodegradable and, in view of the huge volume of such enclosures in use today, the disposal of these enclosures poses either a real or potential environmental problem. One solution to both of these problems has been the development of hybrid packages comprising both paper board and plastic components. These hybrid packages provide a CD package which is suitable and attractive for display, sale and storage of compact discs, yet which is both simple and inexpensive to manufacture.

For example, U.S. Pat. No. 4,709,812—Kosterka discloses a compact disc package formed from a prescored, preprinted unitary blank and at least one injection molded plastic compact disc holder or tray adhesively adhered to one segment of the blank, the blank being adapted to fold along fold lines to position a blank segment over the top of the disc holder to sandwich it, in book style, between the segment to which it is adhered and the overlying segment. The problem with this type of arrangement is that the book frequently opens and provides little protection for the CD content therewithin. In addition, the Kosterka hybrid packaging typically gives the visual appearance of inexpensive packaging, which may not be appropriate or desirable for some of the more expensive visual productions provided on DVD.

In an effort to improve the hybrid packaging and make it more substantial, the compact disc holder, instead of being formed merely as a tray, was formed as an unhinged base and cover which were designed to be separately mounted on facing segments of the blank, on opposite sides of a spine, such that, when the book was closed about the spine, the cover aligned with the base and latched therewith to maintain the disc holder and book closed in order to afford substantial protection to the CD therewithin. Unfortunately, as the book was opened and closed on multiple occasions the cardboard blank stretched and the original alignment between the base and lid became difficult to achieve with consistency, with the result that it became increasingly difficult to reclose and relatch the disc holder.

Still another effort to solve the problems associated with producing a high end hybrid packaging involved vacuforming a unitary, side-by-side storage container base and lid interconnected by a spine and injection molding plastic CD trays designed and dimensioned to be inserted into and adhesively adhered within the vacuformed base and lid in conventional manner. The open vacuformed container housing the injected molded trays is adhesively bonded along its outer surface to a paperboard covering or blank which resembles the covers of a book. When the resulting book is first closed, the vacuformed case breaks along the creases which attach the spine to the base and lid such that, viewing the book in its open orientation, the vacuformed container appears to be three separate pieces separated by paperboard. Unfortunately, the breaks do not always occur neatly, frequently making for an aesthetically unpleasing product. Moreover, the container is impractically expensive to manufacture. First, it is primarily a plastic container, containing a plastic vacuformed skeleton reinforced by injection molded plastic trays adhesively bonded thereto. Second, assembly requires not less than four separate and distinct steps, including vacuforming the container, injection molding the trays, adhesively bonding the trays within the vacuformed base and lid and adhesively bonding the paperboard book-like blank to the exterior surface of the vacuformed container It should be apparent, therefore, that efforts to date directed at hybrid packaging suffer from one or more shortcomings which make the resulting CD packaging either unsatisfactory for repetitive use or insufficiently durable to provide long term protection for the CD content of the package. This is because prior art hybrid packaging is, typically, either uneconomical to manufacture and/or unreliable in use and/or does not function to provide adequate protection to the CD content of the container, as by readily re-closing and re-latching. Accordingly, there remains a need for a simple, inexpensive to manufacture, easy to use hybrid CD package which is reliable for use over the long term.

SUMMARY OF THE INVENTION

It is therefore a primary object of the present invention to provide a high end CD package, configured to resemble a book, comprising two plastic CD trays which can easily be manufactured by injection molding and a paper board cover, where the holder and cover may be readily assembled to provide a CD packaging characterized by consistent tray alignment and latching.

It is also an object of the present invention to provide an improved plastic and paperboard CD package which is simple, inexpensive to manufacture and easy to use.

It is another object of the present invention to provide an improved CD package comprising two plastic CD trays adhesively bonded to a paperboard blank in such a manner that the trays remain in alignment and snap fit together to the closed position.

It is still another object of the present invention to provide a method of assembling an improved CD package comprising two plastic CD trays adhesively bonded to a paperboard blank wherein the paperboard blank is unscored, unfolded and uncreased prior to adhesive bonding and is stretched and folds/creases are formed therein as the blank is adhesively bonded to the plastic CD trays.

The foregoing and other objects are achieved in accordance with the present invention by providing a storage package for a recording medium, such as a CD, comprising a paper board component attached to two plastic, recording medium-holding components, configured to resemble a book, the package including:

a paper board component defining a flat panel having a pair of opposed lateral sides and a pair of opposed transverse side which are generally perpendicular to said lateral sides, said panel including a first panel area for attachment of a first plastic, recording medium-holding component and a second panel area for attachment of a second plastic, recording medium-holding component, said first and second components being separated by a third panel area for defining the spline of the book;

first and second plastic components for receiving and holding a recording medium, each of the components defining:

a generally planar surface having opposite faces for receiving and maintaining a recording medium on a first face thereof, the planar surface having marginal edges defining the peripheral extent of the surface;

upstanding wall portions on the planar surface proximate the marginal edges of the planar surface, the wall portions on the second component being positioned a greater distance inside the marginal edges of the planar surface than on the first component such that, when the components are brought together into first face to first face proximity, the wall portions of the second component nest within the wall portions of the first component with the outside of the wall portions of the second component immediately adjacent the inside of the wall portions of the first component, the separation between the planar surfaces of the components being determined by the height of the wall portions; and means at corresponding locations on the wall portions of the first and second components for releasably engaging and latching the first and second components together in an assembled configuration;

the paperboard component being tautly stretched and adhesively bonded to the assembled components with the creases defining the spline of said book being formed in said paperboard component during adhesive bonding.

In another aspect of the invention, there is provided a method of assembling the storage package for a recording medium characterized by the steps of assembling the first and second components into an assembled configuration and tautly stretching the paper board panel about and adhesively bonding the panel to the assembled components along the faces of the planar surfaces opposite the first face of each component. The paper board panel is, desirably, unscored, uncreased and unfolded prior to adhesive bonding the panel to the assembled components. Thus, the creases defining the spline of the book are formed in the paper board panel during adhesive bonding.

BRIEF DESCRIPTION OF THE DRAWINGS

FIG. 2 is a top plan view of a first element of the plastic CD holder component of the improved CD package of FIG. 1.

FIG. 3 is a front plan view of the element of FIG. 2.

FIG. 4 is a top plan view of the second element of the plastic CD holder component of the improved CD package of FIG. 1.

FIG. 5 is a front plan view of the element of FIG. 4.

FIG. 7 is a top plan view of a blank for the paper board component of the present invention.

FIG. 8 is a top plan view of a blank for the preferred embodiment of the paper board component of the present invention.

DESCRIPTION OF THE PREFERRED EMBODIMENT

Figure 1:
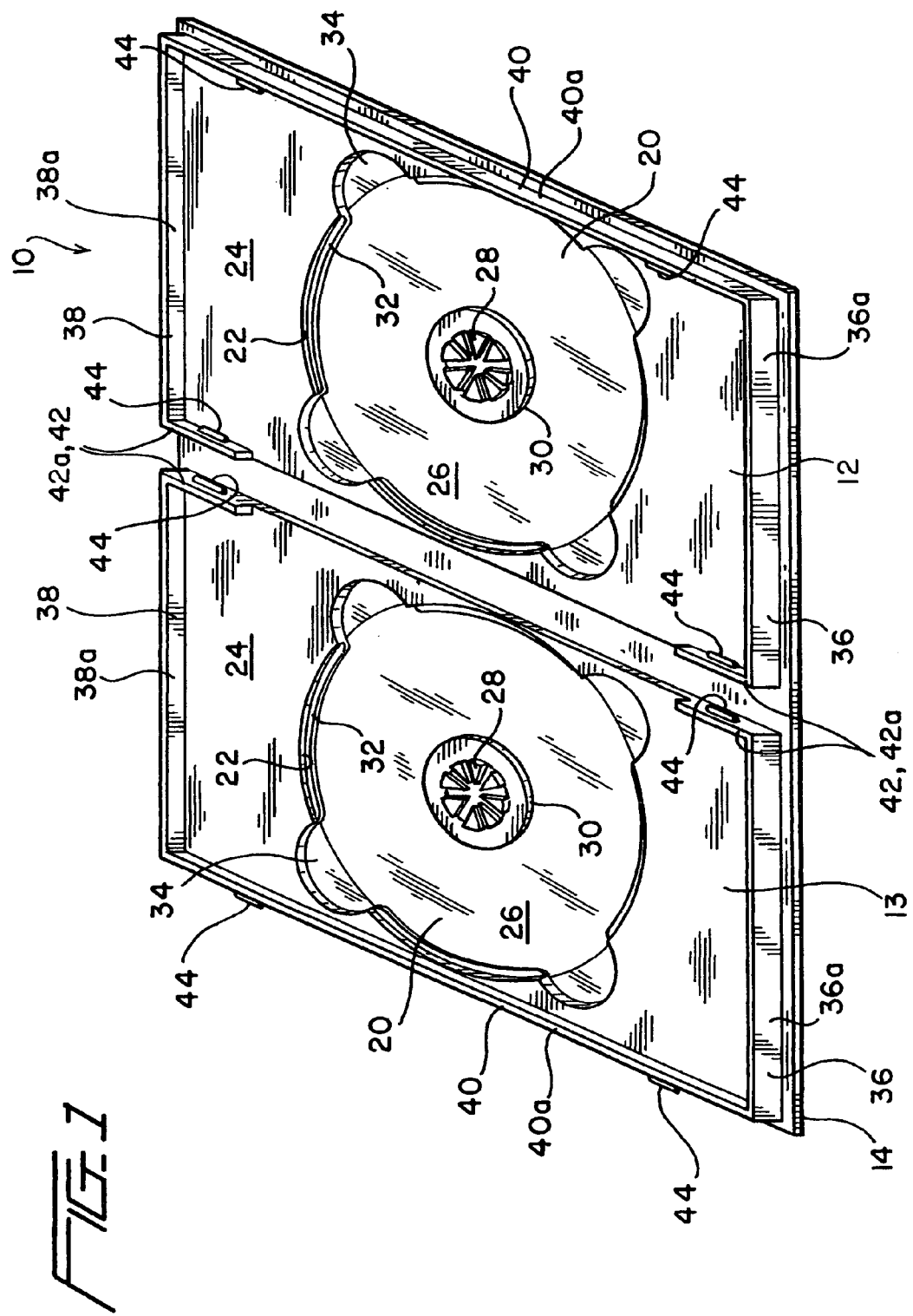
FIG. 1 is a perspective view, viewed from above, of one embodiment of the improved CD package of the present invention in its open position.
Figure 6:
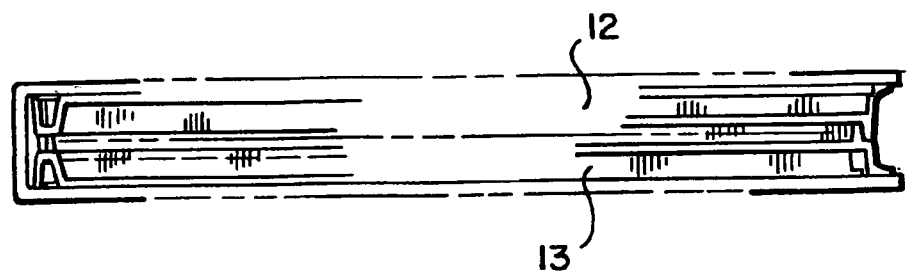
FIG. 6 is a front plan view showing the juxtaposition of the first and second elements of the plastic CD holder component when the same are assembled and snap fit together.

A preferred embodiment of the present invention is illustrated in FIGS. 1, 2, 3, 4, 5, 6 and 9 in which there is illustrated an improved CD package 10. The package includes two injection molded plastic trays 12, 13 and a paper board cover 14 which is, in the preferred embodiment, adhesively attached to each of the trays 12, 13 in accordance with the present invention in such a manner that the plastic and paper components form a CD package, configured to resemble a book, which presents no alignment problems between the trays when the package is repetitively opened and closed Tray 12 is a rectangular, relatively thin plate-like member which is formed with a circular recess 20 defined by a circular side wall 22 extending downwardly from surrounding planar surface 24 to base 26. A rosette 28 for gripping a CD and holding it within recess 20 is molded on raised CD seat 30 which, itself, is molded on base 26. Rosette 28 is, typically, a vertical cylindrical section including radially outwardly biased gripping fingers for engaging the central opening of a CD placed thereon. Raised seat 30 provides a circular surface on which the annular area of the CD which is immediately adjacent the central disc aperture can be supported above the base 26. This area of the CD typically contains no recorded information and, therefore, contact between the CD in this area and the raised seat will not damage the CD. The CD may also be peripherally supported at its outer edges by peripheral shelf 32 formed in circular side wall 22. The outer edges of a CD also, typically, contain no recorded information in order to provide further assurance that contact of the recorded areas of the CD with the base will be avoided. Planar surface 24 of tray 12 includes diametrically opposed finger wells 34 which communicate with the base 26 of recess 20 to facilitate a user removing a recording medium from the recess 20. Recess 22, rosette 28 and finger wells 34 are all well known in the CD packaging art and need not be described in detail herein.

Referring to FIGS. 1–5, two opposite lateral sides 36, 38, one connecting transverse side 40 and upper and lower spaced segments of the opposite transverse side 42 of tray 12 have upstanding wall portions 36a, 38a, 40a, 42a for defining a spacing rim just inside the marginal edges of the tray periphery. As will be seen, when tray 12 is assembled to corresponding tray 13, the wall portions assure a sufficient spacing between a CD mounted on the rosette 28 of tray 12 and a CD mounted on the rosette 28 of tray 13 that neither of the CDs become damaged by contact with the other. In addition, a plurality of protrusions 44 project inwardly from the inside of the wall portions of tray 12 at spaced locations therealong for engaging with corresponding protrusions 44 projecting outwardly from the outside of the wall portions on tray 13 to permit the trays 12, 13 to snap fit together for defining an openable and closable CD packaging.

Tray 13 is a relatively thin plate-like member which is substantially similar to tray 12. The configuration and elements of tray 12 apply equally to tray 13 and, therefore, like reference numerals denote like parts. The major difference between the trays is that the upstanding wall portions of tray 13 are positioned a greater distance inside the marginal edge of the tray than on tray 12 such that, when assembled, the wall portions of tray 13 nest within the wall portions of tray 12 with the outside of the wall portions of tray 13 immediately adjacent the inside of the wall portions of tray 12. This is most easily seen in FIG. 6. In this way protrusions 44 on the inside of the tray 12 wall portions engage correspondingly located protrusions 44 on the outside of the tray 13 wall portions to permit the trays to snap fit together for forming a CD package which can be maintained in the closed position.

Referring now to FIG. 7, the paper board 14 comprises a plurality of paper panels which are desirably formed from a presized, pre-printed unitary blank 50. In one embodiment of the invention, blank 50 is an unscored, unfolded, uncreased blank onto which the plastic trays are adhesively bonded in the manner hereinafter described to provide, when the CD packaging is in the open position, a first panel 52 and a second panel 54 separated by a spline panel 56. Most importantly, is that these panels are undefined by fold lines or creases prior to adhesively bonding the blank to the trays. In this embodiment the blank, i.e., the first panel and second panel are single ply although, in some instances, it may be desirable for one or both of these panels to be two or multiple ply. For example, as shown in phantom in FIG. 7 either or both of the first and second panel areas may be formed as a two ply panel by providing one or more additional rectangular section 60, 62 of substantially the same size as the panel area it is to reinforce and joined along one side thereof by fold line or crease 64, 66. Sections 60 and/or 62 may be folded over crease 64, 66 and glued to the adjacent section 52, 54 to form a two ply panel which may be desirable for aesthetic reasons or to enhance the rigidity of the cover for protecting the CD within the package. Moreover, while a two panel embodiment of a CD package is illustrated and described, it will be appreciated that similar packages utilizing the principles of the present invention may be formed from a greater number of panels by the inclusion of optional panels (not shown) intermediate the base and cover panels. Blank 50 is typically printed with graphics on the outside of the first and second panel areas and on the outside of the spline area. If trays 12, 13 are formed of transparent plastic, then it may be desirable to print the inside of the panel areas as well.

Figure 9:
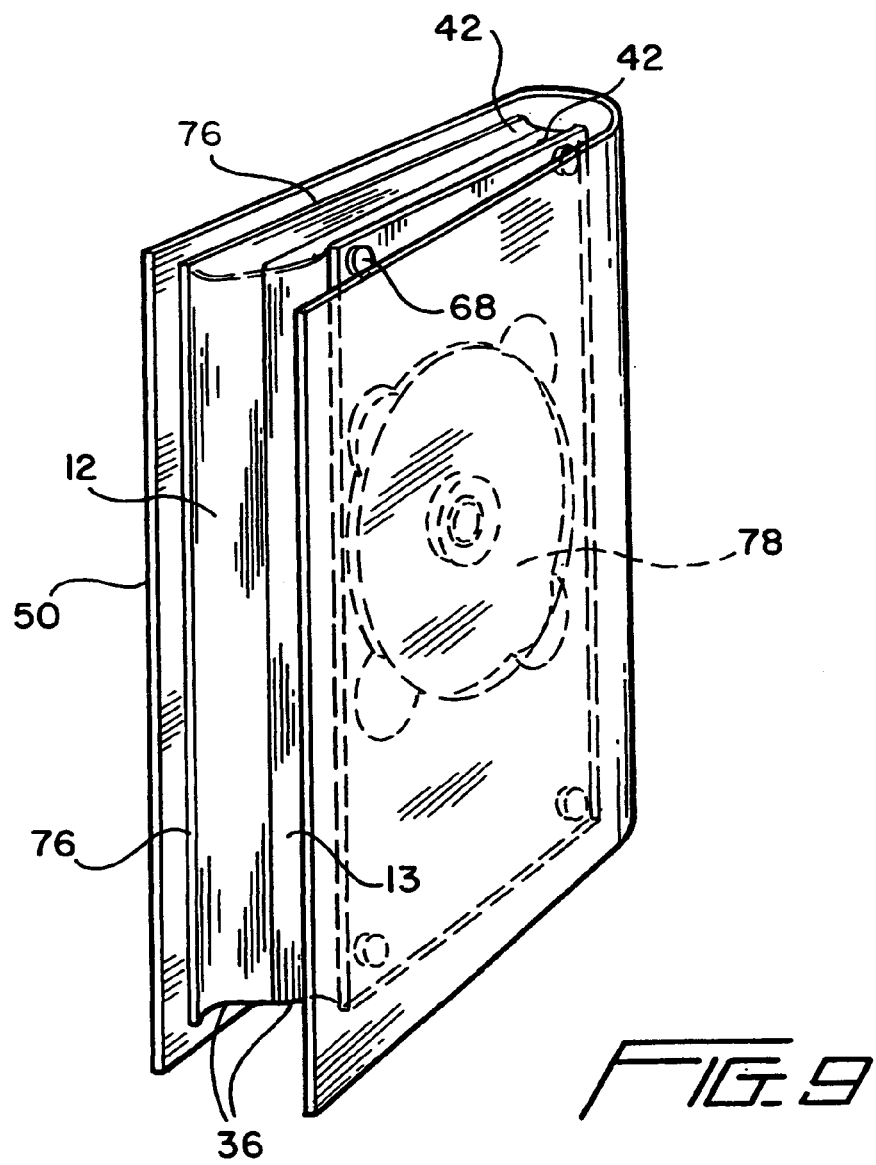
FIG. 9 is an intermediate assembly perspective view of the paperboard cover and the assembled CD holder immediately prior to adhesively bonding these components into the improved CD package of the present invention.

With reference to FIGS. 8 and 9, to assemble the paper board 14 and trays 12, 13, in a preferred embodiment, first and second trays 12, 13 are assembled to each other by causing the rosettes 28 to face each other with partial wall segments 42 of tray 12 aligned with the corresponding segments 42 of tray 13. As the rosettes are pressed toward each other, as can be seen from FIG. 6, the wall portions of tray 13 slide just inside the corresponding wall portions of tray 12 and the protrusions on like wall portions engage to maintain the assembled CD package in the closed position. Blank 50 may be used in its single ply unaltered condition, as shown in FIG. 7. However, it is preferred to adhesively apply paperboard reinforcing sheets 70 to each of the first and second panel areas and, thereafter, to apply a spine reinforcing strip 72 overlying the spine area and, desirably, the spine-adjacent margins of the panel reinforcing sheets 70.

The assembled trays are supported on one of the lateral sides 36, 38 with the paperboard blank 50, prepared as shown in FIG. 8, surrounding the assembled trays in preparation for being adhesively bonded thereto. Desirably, the edge of the assembled tray package corresponding to transverse side 42 serves as the spine of the to-be-assembled hybrid paper-plastic CD package. This is because edge 42 is flat by virtue of omitting therefrom the peripheral rim 76 which extends outwardly from the periphery of the other three sides, 36, 38 and 40 of each of trays 12, 13. The purpose of the peripheral rim 76 is to add rigidity to the ultimate package and to provide a rugged area at which the user can grasp the CD package for opening and closing it.

One of the serious deficiencies of prior art hybrid packages has been that prescored fold lines and creases tend to stretch and distort and paperboard covers tend to stretch with constant folding and unfolding when the CD package is made into a book format. After some time, the alignment between the opposite plastic trays of the book is no longer reproducible, with the result that the package is no longer capable of latching shut. To overcome this problem, in accordance with the present invention, the paperboard cover is applied to the assembled trays in a tautly stretched condition with whatever folds and creases are necessary to conform the paperboard to the assembled trays being formed in place as the paperboard is stretched around the assembled trays. One way of accomplishing this is to tautly stretch the book covers, i.e., the first and second panels 52, 54, generally perpendicularly to and around the spline edge 42 to bring the cover panels 52, 54 into alignment with and adjacent the undersides 78 of the trays 12, 13. A plurality of glue posts 68 are provided on the underside of each tray for receiving adhesive. In addition, dabs of adhesive are applied to the underside 78 of base 26. After the paperboard cover panels 52, 54 are tautly stretched around the spline edge 42 they are placed into adhesive contact with the adhesive on the glue posts 68 and the underside 78 of the base 26. Upon drying, the paperboard blank 50 has already been stretched and the folds and creases necessary for defining the spline of the book have been formed in place during the adhesive bonding process. When formed in this fashion, the alignment between adjacent trays is not subsequently lost due to stretching and folding and the resulting packaging, upon drying of the adhesive, exhibits reproducible opening and snap closing.

While the present invention has been described in terms of specific embodiments thereof, it will be understood that no limitations are intended to the details of construction or design other than as defined in the appended claims.

The invention claimed is:

1. A storage package for a recording medium comprising a paper board component attached to two plastic, recording medium-holding components, configured to resemble a book, said package including:
   A. a paper board component defining a flat panel having a pair of opposed lateral sides and a pair of opposed transverse sides which are generally perpendicular to said lateral sides, said panel including a first panel area for attachment of a first plastic, recording medium-holding component and a second panel area for attachment of a second plastic, recording medium-holding component, said first and second components being separated by a third panel area for defining the spine of said book;
   B. first and second plastic components for receiving and holding a recording medium, each of said components defining:
      (i) a generally planar surface having opposite faces for receiving and maintaining a recording medium on a first face thereof, said planar surface having marginal edges defining the peripheral extent of said surface, an area in the planar surface for receiving a recording medium therein and means in said area for releasably retaining said recording medium in said recess;
      (ii) upstanding wall portions on said planar surface proximate the marginal edges of said planar surface for defining a spacing rim for separating peripheral marginal areas from interior areas of said planar surface, said wall portions being positioned just inside the marginal edges of said planar surface;
      (iii) said wall portions on said second component being positioned a greater distance inside the marginal edges of said planar surface than on said first component such that, when said components are brought together into first face to first face proximity, the wall portions of said second component nest within the wall portions of said first component with the outside of the wall portions of said second component immediately adjacent the inside of the wall portions of said first component and the tops of the wall portions of the first component engage the marginal edges of the planar surface of said second component, the separation between the planar surfaces of said components being determined by the height of said first component wall portions; and
      (iv) means on said first and second components for releasably engaging and latching said first and second components together in an assembled configuration;

said paperboard component being bonded to said first and second components.

2. A storage package, as claimed in claim 1, wherein said generally planar surface of each of said components has a circular recess formed therein for receiving said recording medium and a rosette within said recess for releasably holding said recording medium in said recess.

3. A storage package, as claimed in claim 2, wherein said generally planar surface of each of said components further includes diametrically opposed finger wells communicating with and extending outwardly from said recess for allowing the insertion of fingers therein when removing said recording medium from said recess.

4. A storage package, as claimed in claim 1, wherein said paper board component has dimensions substantially corresponding to the sum of the lateral dimensions of said first and second components plus a transversely extending spine panel between the first and second components, said spine panel being defined by a first transverse crease at the joinder of said first panel area and said spine panel and a parallel second transverse crease at the joinder of said spine panel and said second panel area, said package being pivotable about said creases between a package open orientation wherein said spine and first and second panel areas are substantially coplanar for exposing said recesses in said first and second components to enable access thereto and a package closed orientation wherein said spine panel extends perpendicularly to the generally planar plastic surfaces of said components along one transverse side thereof and said first and second panel areas overlie the undersides of said generally planar plastic surfaces to block access to said recesses and to protect the recording media therewithin.

5. A storage package, as claimed in claim 1, wherein said planar surface has a pair of opposed lateral sides and a pair of opposed transverse sides which are generally perpendicular to said lateral sides for forming said marginal edges defining the peripheral extent of said surface.

6. A storage package, as claimed in claim 5, wherein said wall portions are positioned just inside the marginal edges of said planar surface and extending continuously along the opposed lateral sides, one of said transverse sides, and along transversely spaced segments of the opposite transverse side, said spaced segments extending inwardly from each of the opposed lateral sides.

7. A storage package, as claimed in claim 6, wherein the ends of the spaced segments and the planar surfaces define therebetween an elongate, transversely extending slot when said first and second components are brought together.

8. A storage package for a recording medium comprising a paper board component attached to two plastic, recording medium-holding components, configured to resemble a book, said package including:
   A. a paper board component defining a flat panel having a pair of opposed lateral sides and a pair of opposed transverse sides which are generally perpendicular to said lateral sides, said panel including a first panel area for attachment of a first plastic, recording medium-holding component and a second panel area for attachment of a second plastic, recording medium-holding component, said first and second components being separated by a third panel area for defining the spine of said book;
   B. first and second plastic components for receiving and holding a recording medium, each of said components defining:
      (i) a generally planar surface having opposite faces for receiving and maintaining a recording medium on a first face thereof, said planar surface having a pair of opposed lateral sides and a pair of opposed transverse sides which are generally perpendicular to said lateral sides for forming marginal edges defining the peripheral extent of said surface, an area in the planar surface for receiving a recording medium therein and means in said area for releasably retaining said recording medium in said recess;

(ii) upstanding wall portions on said planar surface proximate the marginal edges of said planar surface for defining a spacing rim for separating peripheral marginal areas from interior areas of said planar surface, said wall portions being positioned just inside the marginal edges of said planar surface and extending continuously along the opposed lateral sides, one of said transverse sides, and along transversely spaced segments of the opposite transverse side, said spaced segments extending inwardly from each of the opposed lateral sides;

(iii) said wall portions on said second component being positioned a greater distance inside the marginal edges of said planar surface than on said first component such that, when said components are brought together into first face to first face proximity, the wall portions of said second component nest within the wall portions of said first component with the outside of the wall portions of said second component immediately adjacent the inside of the wall portions of said first component, the ends of the spaced segments and the planar surfaces define therebetween an elongate, transversely extending slot; and (iv) means on said wall portions of said first and second components for releasably engaging and latching said first and second components together in an assembled configuration;

said paperboard component being bonded to said first and second components with the third panel area of said paperboard component adjacent the nested spaced segments of said assembled components.

9. A storage package, as claimed in claim 8, wherein said generally planar surface of each of said components has a circular recess formed therein for receiving said recording medium and a rosette within said recess for releasably holding said recording medium in said recess.

10. A storage package, as claimed in claim 9, wherein said generally planar surface of each of said components further includes diametrically opposed finger wells communicating with and extending outwardly from said recess for allowing the insertion of fingers therein when removing said recording medium from said recess.

11. A storage package, as claimed in claim 8, wherein said paper board component has dimensions substantially corresponding to the sum of the lateral dimensions of said first and second components plus a transversely extending spine panel between the first and second components, said spine panel being defined by a first transverse crease at the joinder of said first panel area and said spine panel and a parallel second transverse crease at the joinder of said spine panel and said second panel area, said package being pivotable about said creases between a package open orientation wherein said spine and first and second panel areas are substantially coplanar for exposing said recesses in said first and second components to enable access thereto and a package closed orientation wherein said spine panel extends perpendicularly to the generally planar plastic surfaces of said components along one transverse side thereof and said first and second panel areas overlie the undersides of said generally planar plastic surfaces to block access to said recesses and to protect the recording media therewithin.

12. A storage package for a recording medium comprising a paper board component attached to two plastic, recording medium-holding components, configured to resemble a book, said package including:

A. a paper board component defining a flat panel having a pair of opposed lateral sides and a pair of opposed transverse sides which are generally perpendicular to said lateral sides, said panel including a first panel area for attachment of a first plastic, recording medium-holding component and a second panel area for attachment of a second plastic, recording medium-holding component, said first and second components being separated by a third panel area for defining the spine of said book;

B. first and second plastic components for receiving and holding a recording medium, each of said components defining:

(i) a generally planar surface having opposite faces for receiving and maintaining a recording medium on a first face thereof, said planar surface having a pair of opposed lateral sides and a pair of opposed transverse sides which are generally perpendicular to said lateral sides for forming marginal edges defining the peripheral extent of said surface, a recess in the planar surface for receiving a recording medium therein and means in said recess for releasably retaining said recording medium in said recess;

(ii) upstanding wall portions on said planar surface proximate the marginal edges of said planar surface for defining a spacing rim for separating peripheral marginal areas from interior areas of said planar surface, said wall portions being positioned just inside the marginal edges of said planar surface and extending continuously along the opposed lateral sides, one of said transverse sides, and along transversely spaced segments of the opposite transverse side, said spaced segments extending inwardly from each of the opposed lateral sides;

(iii) said wall portions on said second component being positioned a greater distance inside the marginal edges of said planar surface than on said first component such that, when said components are brought together into first face to first face proximity, the wall portions of said second component nest within the wall portions of said first component with the outside of the wall portions of said second component immediately adjacent the inside of the wall portions of said first component, the separation between the planar surfaces of said components being determined by the height of said first component wall portions; and (iv) projections positioned on the outer surface of the wall portions of the spaced segments of said second component and projections positioned at corresponding locations on the inner surface of the wall portions of the spaced segments of said first component for snap fitting one over the other for releasably engaging and latching said first and second components together in an assembled configuration;

said paperboard component being bonded to said assembled components with the third panel area of said paperboard component adjacent the nested spaced segments of said assembled components.

13. A storage package, as claimed in claim 12, wherein said generally planar surface of each of said components has a circular recess formed therein for receiving said recording medium and a rosette within said recess for releasably holding said recording medium in said recess.

14. A storage package, as claimed in claim 13, wherein said generally planar surface of each of said components further includes diametrically opposed finger wells communicating with and extending outwardly from said recess for allowing the insertion of fingers therein when removing said recording medium from said recess.

15. A storage package, as claimed in claim 12, wherein said paper board component has dimensions substantially corresponding to the sum of the lateral dimensions of said first and second components plus a transversely extending spine panel between the first and second components, said spine panel being defined by a first transverse crease at the joinder of said first panel area and said spine panel and a parallel second transverse crease at the joinder of said spine panel and said second panel area, said package being pivotable about said creases between a package open orientation wherein said spine and first and second panel areas are substantially coplanar for exposing said recesses in said first and second components to enable access thereto and a package closed orientation wherein said spine panel extends perpendicularly to the generally planar plastic surfaces of said components along one transverse side thereof and said first and second panel areas overlie the undersides of said generally planar plastic surfaces to block access to said recesses and to protect the recording media therewithin.

* * * * *